(12) United States Patent
Steele et al.

(10) Patent No.: US 8,776,541 B2
(45) Date of Patent: Jul. 15, 2014

(54) START-UP CONTROL FOR REFRIGERATION SYSTEM

(75) Inventors: John T. Steele, Marcellus, NY (US); Scott D. Fulmer, Liverpool, NY (US); Peter P. Guzman, Marcellus, NY (US); Donald B. Hotaling, Jamesville, NY (US); John R. Reason, Liverpool, NY (US)

(73) Assignee: Carrier Corporation, Farmington, CT (US)

( * ) Notice: Subject to any disclaimer, the term of this patent is extended or adjusted under 35 U.S.C. 154(b) by 728 days.

(21) Appl. No.: 12/992,698

(22) PCT Filed: Jul. 1, 2009

(86) PCT No.: PCT/US2009/049385
§ 371 (c)(1),
(2), (4) Date: Nov. 15, 2010

(87) PCT Pub. No.: WO2010/002978
PCT Pub. Date: Jan. 7, 2010

(65) Prior Publication Data
US 2011/0088411 A1    Apr. 21, 2011

Related U.S. Application Data

(60) Provisional application No. 61/077,417, filed on Jul. 1, 2008.

(51) Int. Cl.
*F25D 17/00* (2006.01)
*F25B 49/00* (2006.01)

(52) U.S. Cl.
USPC ................................. 62/180; 62/230; 62/244

(58) Field of Classification Search
USPC ................. 62/179, 180, 228.1, 230, 243, 244
See application file for complete search history.

(56) References Cited

U.S. PATENT DOCUMENTS

| | | | |
|---|---|---|---|
| 5,129,235 A | 7/1992 | Renken et al. | |
| 5,577,390 A | 11/1996 | Kaido et al. | |
| 5,626,027 A | 5/1997 | Dormer et al. | |
| 6,301,911 B1 | 10/2001 | Reason et al. | |
| 6,321,550 B1 | 11/2001 | Chopko et al. | |
| 2002/0108387 A1 | 8/2002 | Barrett et al. | |

FOREIGN PATENT DOCUMENTS

| | | | |
|---|---|---|---|
| JP | 5-238306 A1 | 9/1993 | |
| JP | 2004316934 A | * 11/2004 | |
| JP | 2005349891 A1 | 12/2005 | |
| WO | 03/093737 A1 | 11/2003 | |
| WO | 2008/085516 A1 | 7/2008 | |

OTHER PUBLICATIONS

International Search Report and Written Opinion for PCT/US2009/049385, dated Feb. 9, 2010.

* cited by examiner

*Primary Examiner* — Marc Norman
(74) *Attorney, Agent, or Firm* — Bachman & LaPointe, P.C.

(57) ABSTRACT

A transport refrigeration system has an engine driving an electric generator. A compressor is powered by the generator. At least one first electric fan is positioned to drive an airflow across a heat rejection heat exchanger. At least one second electric fan is positioned to drive an airflow across a heat absorption heat exchanger. A controller is coupled to the compressor and first and second fans. The controller is configured to: start the engine; engage the generator and at least one of the first fans before the engine has reached running speed; after the engine has reached running speed, start the compressor; and after starting the compressor, start at least one of the second fans.

13 Claims, 2 Drawing Sheets

START-UP CONTROL FOR REFRIGERATION SYSTEM

CROSS-REFERENCE TO RELATED APPLICATION

Benefit is claimed of U.S. patent application Ser. No. 61/077,417, filed Jul. 1, 2008, and entitled "START-UP CONTROL FOR REFRIGERATION SYSTEM", the disclosure of which is incorporated by reference herein in its entirety as if set forth at length.

BACKGROUND

The disclosure relates to refrigeration. More particularly, the disclosure relates to electrically powered refrigerated transport systems.

A transport refrigeration system used to control enclosed areas, such as the box used on trucks, trailers, containers, or similar intermodal units, functions by absorbing heat from the enclosed area and releasing heat outside of the box into the environment. A number of transport refrigeration units, including units currently sold by assignee, employ a reciprocating compressor to pressurize refrigerant to enable the removal of heat from the box. Reciprocal compressors used in such applications commonly include a suction inlet and a discharge which are connected, respectively, to the evaporator and condenser of the transport refrigeration system. It is axiomatic that in order to ensure the reliability of the reciprocating compressor, the compressor should operate within the limits of the suction and discharge pressures for which it was designed. The ranges and ratios of suction and discharge pressures designed to be handled by a reciprocating compressor at various stages of operation is known as an operating envelope. The failure to operate within the compressor operating envelope will result in unnecessary wear and tear, and ultimately will bring about the premature failure of the compressor, thus creating unacceptable costs of money and time to the operator.

Exemplary refrigerated transport systems use generators powered by internal combustion engines to power the compressors and any fans associated with the evaporator and condenser. U.S. Pat. No. 6,321,550, the disclosure of which is incorporated by reference in its entirety herein as if set forth at length, assigned to the assignee of the present application, discloses such a generator and associated control methods.

Transport refrigeration systems currently employ a variety of controls to manipulate the operating envelope of a reciprocating compressor. As can be shown by U.S. Pat. Nos. 5,626,027 and 5,577,390, both assigned to the assignee of the present application, compressors can be operated in a multi-stage mode or in single stage modes depending upon operating temperature. Such disclosures further discuss generally the use of suction modulation for capacity control.

U.S. Pat. No. 6,301,911 discloses use of a controller within the transport refrigeration system which closes the suction modulation valve (the "SMV") and/or unloads compressor cylinder banks in response to discharge pressures in excess of a preselected limit calculated or compared to a set value by the controller. An unloader, when energized has the effect of removing one or more cylinders from operation within compressor, thus effectively reducing the displaced volume within the compressor. Maintaining the reciprocating compressor within its design operating envelope may be achieved by selectively unloading compressor cylinder banks in the event that suction pressure is below the minimum suction pressure allowed, as determined the controller.

There are many operational considerations for the units. Several considerations involve the temperature at which the enclosed area is to be kept. A given unit configuration may be made manufactured for multiple operators with different needs. Broadly, the temperature may be separated into two fields: frozen goods; and non-frozen perishables. An exemplary frozen goods temperature is about −10° F. or less an exemplary non-frozen perishable temperature is 34-38° F. Many operators will have the need to, at different times, use a given unit for transport of frozen goods and non-frozen perishables. The operator will predetermine appropriate temperature for each of the two modes. prior to a trip or series, the driver will enter the appropriate one of the two temperatures.

SUMMARY

One aspect of the disclosure involves a refrigeration system having an engine and an electric generator mechanically coupled to the engine to be driven by the engine. The system has a compressor electrically coupled to the generator to be powered by the generator. The heat rejection heat exchanger is coupled to the compressor to receive compressed refrigerant from the compressor. An expansion device is coupled to the heat rejection heat exchanger to expand refrigerant received from the heat rejection heat exchanger. The heat absorption heat exchanger is coupled to the expansion device to receive refrigerant expanded by the expansion device and, in turn, coupled to the compressor to return refrigerant to the compressor. At least one first electric fan is positioned to drive an airflow across the heat rejection heat exchanger and coupled to the generator to receive electric power from the generator. At least one second electric fan is positioned to drive an airflow across the absorption heat exchanger and coupled to the generator to receive electric power from the generator. A controller is coupled to the compressor and first and second fans. The controller is configured (e.g., via software/programming and/or hardware/hardwiring) to: start the engine; engage the generator and at least one of the first fans before the engine has reached running speed; after the engine has reached running speed, start the compressor; and after starting the compressor, start at least one of the second fans.

In various implementations, the system may further comprise a compartment positioned to be cooled by the heat absorption heat exchanger. The controller may be configured to disengage a starter (of the engine) before starting the compressor. There may be a plurality of the first fans and a plurality of the second fans and the controller may be configured/programmed to perform the start of all the first fans together and perform the start of all the second fans together. The controller may be configured to load one or more cylinders after starting the compressor but before starting the second fans.

The controller may have six cylinders. From starting the compressor, the first and second cylinders may be loaded. The one or more cylinders loaded after starting the compressor and before starting the second fans may be the third and fourth cylinders. The compressor or controller may be configured to load the fifth and sixth cylinders responsive to determined demand after the second fans are started. The controller may be configured to perform a pre-start initialization comprising: controller self-diagnostics; checking of sensors to verify presence and operation; checking battery condition; checking pressures and temperatures outputted by said sensors; and re-zeroing and pre-staging one or more valves, including the expansion device. The controller may be configured to engage the generator and first fans before starting the engine.

The system may be formed by reconfiguring the controller from a baseline condition wherein the baseline controller is configured to engage the compressor before engaging the fans (i.e., as a retrofitting of an existing system including reprogramming or other reconfiguration).

In another characterization of the description above, the controller may be configured to use the generator and at least one of the first fans to stabilize engine load swings associated with compressor start-up. Such a controller may be configured to start the second fans after starting the compressor and/or start all the first fans before starting the compressor.

Other aspects involve methods for operating such a system. In an exemplary method, the engine is started. Before the engine has reached the running speed, the generator and first fans are engaged. After the engine has reached the running speed, the compressor is started. After starting the compressor, the second fans are started. The method may further include loading one or more cylinders after starting the compressor but before starting the second fans. A pre-start initialization as discussed above may be performed.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 3 is a schematic view of a compressor of the refrigeration system of FIG. 2.

Like reference numbers and designations in the various drawings indicate like elements.

DETAILED DESCRIPTION

Figure 1:
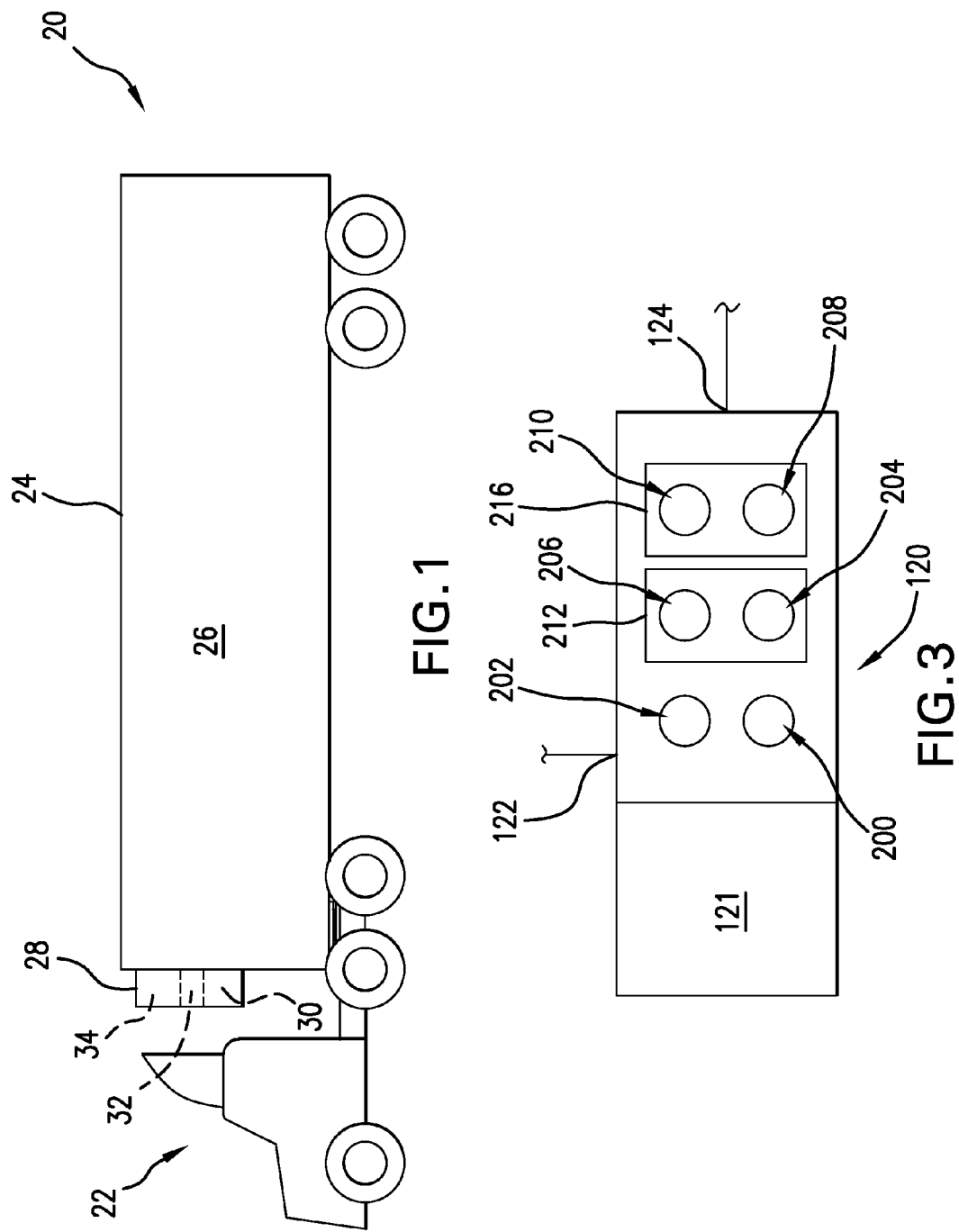
FIG. 1 is a view of a refrigerated transport system.

FIG. 1 shows a refrigerated transport unit (system) 20 in the form of a refrigerated trailer. The trailer may be pulled by a tractor 22. The exemplary trailer includes a container/box 24 defining an interior/compartment 26. An equipment housing 28 mounted to a front of the box 24 may contain an electric generator system including an internal combustion engine 30 (e.g., compression ignition/diesel) and an electric generator 32 mechanically coupled to the engine to be driven thereby. A refrigeration system 34 may be electrically coupled to the generator 32 to receive electrical power.

Figure 2:
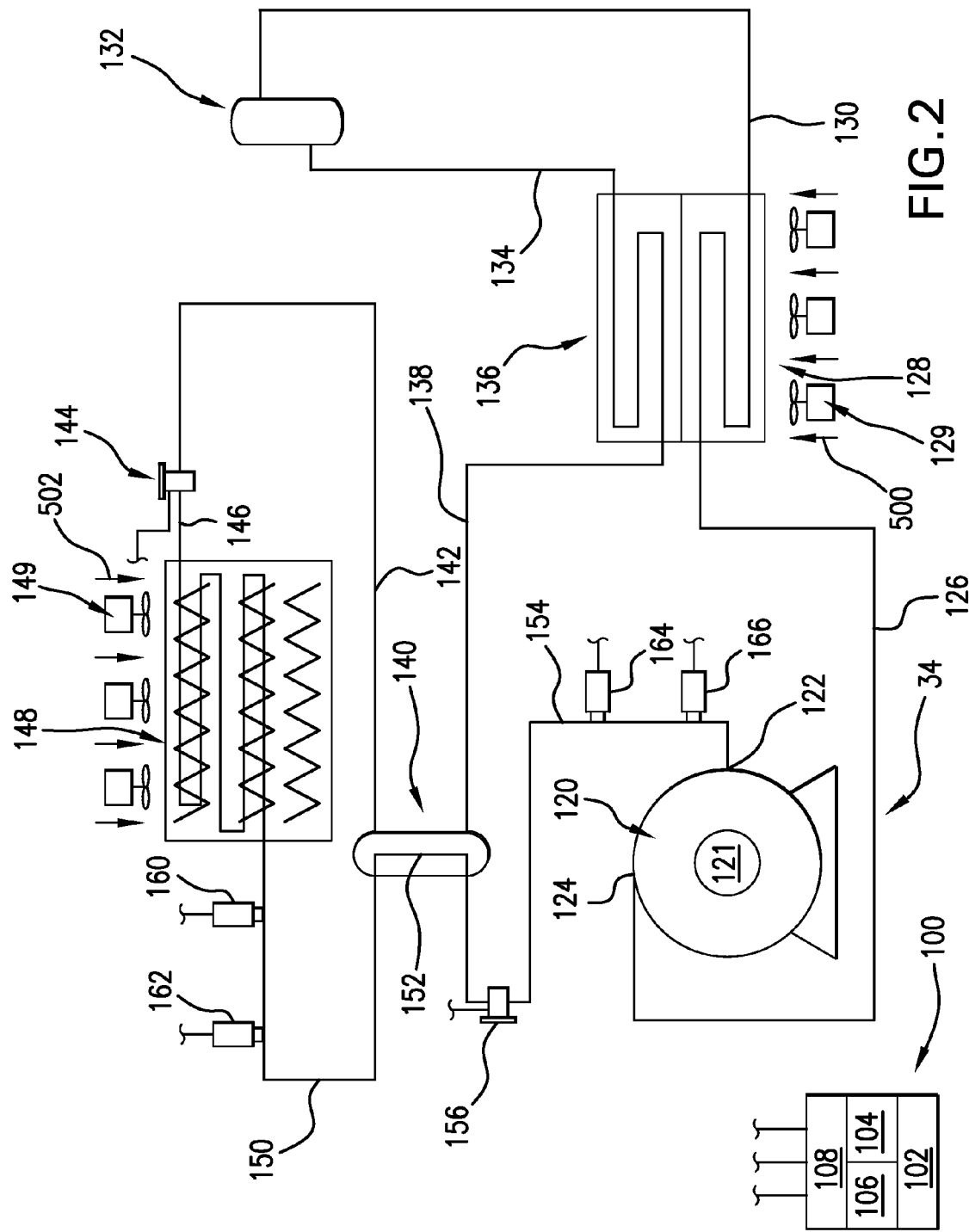
FIG. 2 is a schematic view of a refrigeration system of the transport system of FIG. 1.

FIG. 2 shows further details of the exemplary refrigeration system 34. The system 34 includes a control system 100. The control system 100 may include: one or more user interface (e.g., input/output) devices 102; processors 104; memory 106; and hardware interface devices 108 (e.g., ports). An exemplary system 34 is illustrated based upon the system of PCT/US07/60220. Further details of such a system are shown in U.S. Pat. No. 6,321,550.

The system 34 further includes a compressor 120 having a suction (inlet) port 122 and a discharge (outlet) port 124. An exemplary compressor 120 is an electrically-powered reciprocating compressor having an integral electric motor 121. The compressor 120 may be coupled to the control system 100 to regulate its operation and to the generator 32 to receive power. A discharge line section/segment 126 extends from the discharge port 124 downstream along a refrigerant primary flowpath to an inlet of a heat rejection heat exchanger (condenser) 128. A hot liquid refrigerant line section/segment 130 extends downstream from an outlet of the condenser 128 to an inlet of an exemplary receiver 132. A hot liquid line section/segment 134 extends from an outlet of the receiver 132 to an inlet of a subcooler 136. The subcooler 136 and condenser 128 may be positioned to receive an external airflow 500 (e.g., driven by one or more fans 129). A liquid line section/segment 138 extends downstream from an outlet of the subcooler 136 to an inlet of a suction line heat exchanger (SLHX) 140. A further liquid line section/segment 142 of the refrigerant line extends downstream from an outlet of the SLHX 140 to an inlet of an expansion device (e.g., an electronic expansion valve (EEV)) 144. A final liquid line section/segment 146 extends from an outlet of the electronic expansion valve 144 to an inlet of a heat absorption heat exchanger (evaporator) 148. The evaporator 148 may be positioned to receive an external airflow 502 (e.g., driven by one or more fans 149). A first section/segment 150 of a suction line extends downstream from the outlet of the evaporator 148 to the suction line heat exchanger 140. A second section/segment 152 of the suction line extends within the suction line heat exchanger 140 to form a downstream leg in heat exchange relation with fluid in the upstream leg of the heat exchanger 140. A final section/segment 154 of the suction line returns to the suction port 122. A compressor suction modulation valve (CSMV) 156 may be located in the line 154

The physical configuration of the system is merely illustrative and may schematically represent any of a number of existing or yet-developed constructions. The inventive methods described below may also be applicable to other constructions.

The system 34 may include various additional components including valves, sensors, and the like. Of these, sufficient sensors for determining a characteristic evaporator superheat and a characteristic suction superheat may be present and particular exemplary implementations are described below. An exemplary characteristic evaporator superheat is an evaporator outlet superheat (EVOSH) and may be determined responsive to measurements of an evaporator outlet temperature (EVOT) and an evaporator outlet pressure (EVOP). Accordingly, the exemplary system 34 includes an EVOP sensor 160 and an EVOT sensor 162 along the segment 150 and in signal communication with the control system 100. The suction superheat (SSH) may similarly be determined responsive to measurements of compressor suction temperature (CST) and compressor suction pressure (CSP). Along the segment 154 downstream of the SLHX 140, a pressure sensor 164 and a temperature sensor 166 are similarly positioned for measuring CSP and CST, respectively.

In operation, a user will enter a temperature at which the compartment 26 is to be maintained. In one basic example, immediate entry may be by means of a simple two position switch wherein one position is associated with frozen goods and another position is associated with non-frozen perishable goods. The control system 100 may be pre-programmed (via software and/or hardware inputs) with associated target compartment temperatures. For example, a frozen goods target temperature may typically be a particular temperature in a range of about −10° F. or below whereas a non-frozen perishable goods temperature may be a particular temperature in a range of about 34-38° F. The particular values may be pre-set according to the needs of the particular unit operator.

Start-up issues may attend operation of the system 20. An exemplary compressor 120 (FIG. 3) is a six cylinder reciprocating compressor having a number one cylinder 200 a number two cylinder 202, a number three cylinder 204, a number four cylinder 206, a number five cylinder 208, and a number six cylinder 210. The compressor includes an unloader 212 positioned to selectively unload/load the number three and four cylinders and an unloader 216 positioned to selectively load/unload the number five and six cylinders. By use of the loaders 212 and 216, the compressor may be operated in two-cylinder, four-cylinder, or six-cylinder modes. Staged loading may be relevant both at start-up and in subsequent operation. In the exemplary system 20, all the electric components of the refrigeration system are coupled directly or indirectly to the electric generator. An indirect coupling may include intervening power management systems including a storage device such as a battery or capacitor. Thus, in the exemplary system 20, the compressor motor 121, fans 129 and 149, unloaders 212 and 216, and other electric equipment are directly or indirectly powered by the generator. These components may also be coupled to the control system 100.

Management of the electrical load during a start-up sequence may be desired for one or more of several reasons. These reasons include: ease of starting; controlling system wear; controlling noise and other user-perceived phenomena; and the like. Accordingly, the sequence of engaging/starting various electrical loads may be coordinated with engine start-up to provide a desired balance of these factors. In an exemplary start-up sequence, initially, the engine 30 is off, the compressor 120 is off, the fans 129 and 149 are off and the unloaders are de-energized.

An initial staging phase of start-up may occur once the start command is given (e.g., by a user throwing a switch or otherwise providing a start command input to the controller). An exemplary staging includes: controller self-diagnostics for verifying processor function and unit configuration; controller checking of the various sensors to verify their presence and operation; controller checking of system status (e.g., based upon outputs of the sensors such as sufficient battery charge for starting, and various sensed pressures and temperatures); and recalibrating the various valves, including the expansion device, by re-zeroing and pre-staging the valves (e.g., to pre-stage conditions determined based upon the sensed conditions and inputted/commanded target conditions). The staging may be accompanied by or followed by: energizing the unloaders to place the compressor in two-cylinder mode; engaging the generator; and engaging the condenser fans 129. The controller may set the engine control unit for an initial low speed target. Other engine initialization steps may include glow plug energizing for a diesel engine (e.g., according to a temperature-dependent map/schedule). After a first interval (e.g., approximately thirty seconds) from the start command, the controller will engage the engine starter and attempt to start the engine. At some point after firing of the engine, the controller determines the engine to have started and disengages the starter (e.g., upon reaching a first threshold speed (e.g., approximately 1,000 rpm)). Then the engine speed will rise further. In the exemplary implementation, the compressor may then be engaged (in two-cylinder mode to minimize initial load). Exemplary compressor engagement occurs at a second threshold speed (e.g., approximately 1,350 rpm). This speed will typically be reached within an interval of 5-10 seconds. After a third interval (e.g., also an exemplary 5-10 seconds) the controller will load the number three and four cylinders to switch the compressor to four-cylinder mode. After another interval (e.g., when the engine has restabilized to a running speed of approximately 1,350 rpm), the evaporator fans 149 will be engaged/started. In the exemplary implementation, the six-cylinder mode may be later engaged as may be required by demand.

The foregoing exemplary sequence uses the load of the condenser fans 129 to stabilize engine load swings associated with compressor start-up. Typically, compressor load is the most significant steady-state and start-up load on the engine. Engaging the compressor before other electrical loads may produce undesirably high load-swings. By first starting the condenser fans, the engine is preloaded, thereby reducing the significance of the compressor start-up load.

One or more embodiments have been described. Nevertheless, it will be understood that various modifications may be made. For example, implementations may be as simple as reprogramming controllers of any of a variety of existing refrigeration systems. Alternatively, alternative implementations might involve redesigning components of a baseline system to take advantage of the reduced load fluctuations (e.g., by reducing engine or generator size, flywheel weight or inertia, or the like). Accordingly, other embodiments are within the scope of the following claims.

What is claimed is:

1. A refrigeration system (20) comprising:
   an engine (30);
   an electric generator (32) mechanically coupled to the engine to be driven by the engine;
   a compressor (120), electrically coupled to the generator to be powered by the generator;
   a heat rejection heat exchanger (128) coupled to the compressor to receive compressed refrigerant from the compressor;
   an expansion device (144) coupled to the heat rejection heat exchanger to expand refrigerant received from the heat rejection heat exchanger;
   a heat absorption heat exchanger (148) coupled to the expansion device to receive refrigerant expanded by the expansion device and, in turn, coupled to the compressor to return refrigerant to the compressor;
   at least one first electric fan (129) positioned to drive an airflow (500) across the heat rejection heat exchanger and coupled to the generator to receive electric power from the generator;
   at least one second electric fan (149) positioned to drive an airflow (502) across the heat absorption heat exchanger and coupled to the generator to receive electric power from the generator; and
   a controller (100) coupled to the compressor and first and second fans and configured to:
   start the engine;
   engage the generator and at least one of the first fans before the engine has reached running speed;
   after the engine has reached running speed, start the compressor; and
   after starting the compressor, start at least one of the second fans.

2. The system of claim 1 being a transport refrigeration system further comprising a refrigerated compartment (26) positioned to be cooled by the heat absorption heat exchanger.

3. The system of claim 2 wherein the compartment is formed by at least one of a trailer body or a cargo container.

4. The system of claim 1 wherein the controller is configured to:
   disengage a starter before starting the compressor.

5. The system of claim 1 wherein:
   there are a plurality of said first fans;
   there are a plurality of said second fans; and
   the controller is configured to:
   perform said start of all the first fans together; and
   perform said start of all the second fans together.

6. The system of claim 1 wherein the controller is configured to:
   load one or more cylinders after starting the compressor but before starting the second fans.

7. The system of claim 6 wherein:
the compressor has six cylinders;
the controller is configured so that from starting the compressor, the first and second said cylinders are loaded;
the controller is configured so that said one or more cylinders loaded after starting the compressor and before starting the second fans are third and fourth cylinders; and
the controller is configured to load the fifth and sixth said cylinders responsive to determined demand after the second fans are started.

8. The system of claim 1 wherein the controller is configured to perform a pre-start initialization comprising:
controller self-diagnostics;
checking of sensors to verify presence and operation;
checking battery condition;
checking pressures and temperatures outputted by said sensors; and
re-zeroing and pre-staging one or more valves, including the expansion device (144).

9. The system of claim 1 wherein the controller is configured to engage the generator and first fans before starting the engine.

10. A method for forming the system of claim 1 comprising reconfiguring the controller from a baseline wherein the baseline controller is configured to engage the compressor before engaging the first fans.

11. A method for operating a refrigeration system, the system comprising:
an engine;
an electric generator mechanically coupled to the engine to be driven by the engine;
a compressor, electrically coupled to the generator to be powered by the generator;
a heat rejection heat exchanger coupled to the compressor to receive compressed refrigerant from the compressor;
an expansion device coupled to the heat rejection heat exchanger to expand refrigerant received from the heat rejection heat exchanger;
a heat absorption heat exchanger coupled to the expansion device to receive refrigerant expanded by the expansion device and, in turn, coupled to the compressor to return refrigerant to the compressor;
at least one first electric fan positioned to drive an airflow across the heat rejection heat exchanger and coupled to the generator to receive electric power from the generator;
at least one second electric fan positioned to drive an airflow across the heat absorption heat exchanger and coupled to the generator to receive electric power from the generator; and
the method comprising:
starting the engine;
before the engine has reached a running speed, engaging the generator and first fans;
after the engine has reached the running speed, starting the compressor; and
after starting the compressor, starting the second fans.

12. The method of claim 11 further comprising:
loading one or more cylinders after starting the compressor but before starting the second fans.

13. The method of claim 12 wherein:
the compressor has six cylinders;
from starting the compressor, the first and second said cylinders are loaded;
said one or more cylinders loaded after starting the compressor and before starting the second fans are third and fourth cylinders; and
the compressor is configured to load the fifth and sixth said cylinders responsive to determined demand after the second fans are started.

* * * * *